United States Patent Office 3,787,402
Patented Jan. 22, 1974

3,787,402
THIO-DERIVATIVES OF 1,2-BENZOTHIAZINE DIOXIDES
Chris Royce Rasmussen, Ambler, Pa., assignor to McNeil Laboratories, Inc.
No Drawing. Filed Oct. 2, 1972, Ser. No. 294,121
Int. Cl. C07d 93/02
U.S. Cl. 260—243 R            4 Claims

ABSTRACT OF THE DISCLOSURE

The compounds herein are 1,2,3,4-tetrahydro-11-hydroxypyrazino[1,2-b]-1,2-benzothiazin-1(2H) - one 6,6-dioxides, useful for their ultraviolet absorption and central nervous system depressant activity.

DESCRIPTION OF THE INVENTION

This invention relates to novel 1,2-benzothiazine dioxides having the formula:

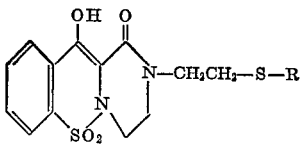

wherein R is a member of the group consisting of loweralkyl, phenyl, substituted phenyl, and phenyl-loweralkyl. The term "substituted phenyl" is meant to include phenyl substituted with one or more, preferably 1 to 2, of the following: loweralkyl, loweralkoxy, and halo. As used herein "loweralkyl" and "loweralkoxy" mean straight or branched chain saturated aliphatic hydrocarbons having from 1 to about 5 carbon atoms, for example, methyl, ethyl, propyl, isopropyl, pentyl, and the like; and the corresponding alkoxy derivatives, for example, methoxy, ethoxy, propoxy, isopropoxy, pentoxy, and the like. The term "halo" is meant to include fluoro, chloro, bromo, and iodo.

The compounds of Formula I are prepared from (1,2,3,4-tetrahydro - 11 - hydroxy-1-oxopyrazino[1,2-b]-1,2-benzothiazin-2-yl)ethyl methanesulfonate 6,6-dioxide (II), described in my copending application Ser. No. 294,126 entitled, "Novel 1,2-Benzothiazine Dioxides and Precursors Therefor," filed on the same date as the instant application, by reacting the latter with a slight molar excess each of sodium methoxide and a mercaptan of formula RSH, wherein R is as previously defined. The reaction is conducted in a suitable organic solvent, such as, for example, an ether, e.g., ethyl ether, dioxane, tetrahydrofuran, and the like; a loweralkanol, e.g., ethanol, isopropanol, butanol, and the like; dimethylformamide; dimethylsulfoxide; and the like. This reaction may be illustrated as follows:

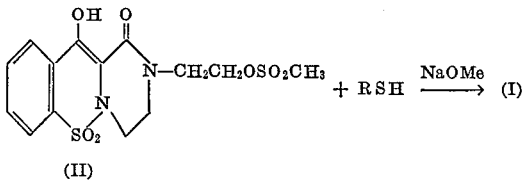

The compounds of Formula I absorb ultraviolet (U.V.) light above 300 nm. and are useful as U.V. screening materials. For example, when R=C$_6$H$_5$CH$_2$, ϵ=10,900 for λ max.=345 nm.; when R=CH$_3$, ϵ=12,000 for λ max.=345 nm.; when R=C$_6$H$_5$, ϵ=9,200 for λ max.=345 nm. Because of their general solubility in organic materials, they may be used as U.V.-absorbers in plastics and resins such as, for example, polystyrene, polyethylene, polypropylene, polyacrylics (e.g., methacrylate resins, polyacrylamides, polyacrylonitrile fibers, etc.), polyamide (e.g., nylon) fibers, and polyester fibers. The inclusion of about 0.01–5.0 percent of the absorber, based on the polymer weight, is usually sufficient to render protection against U.V. light, such as in plastic films, filters, etc. The absorber may be incorporated into the mixture of monomers before polymerization to form the polymer or it may be incorporated into the polymer at other stages during its handling, as by milling into the polymer together with other compounding ingredients, or during the spinning of the polymer into fibers, etc.

These compounds are also useful for their central nervous system depressant activity as indicated by such symptoms as ataxia, decrease in motor activity, and loss of righting reflex in mice after intraperitoneal (i.p.) administration of the Compounds I when tested at doses of about 100 mg./kg. body weight.

The following examples are intended to illustrate, but not to limit, the scope of the present invention.

EXAMPLE I 2-(2-benzylthioethyl)-1,2,3,4-tetrahydro-11-hydroxypyrazinol[1,2-b]-1,2-benzothiazin-1(2H)-one 6,6-dioxide To a solution of sodium methoxide in dimethylformamide (prepared by dissolving 0.92 g. (0.0395 mole) of sodium in 20 ml. of methanol, removing the excess methanol in vacuo, and adding 20 ml. of dimethylformamide) is added 4.9 g. (0.039 mole) of α-thiotoluene with stirring. Then 15.0 g. (0.038 mole) of (1,2,3,4-tetrahydro-11-hydroxy - 1 - oxopyrazino[1,2-b]-1,2-benzothiazin-2-yl)ethyl methanesulfonate 6,6-dioxide is added slowly with stirring. After the addition is complete, the solvent is removed in vacuo, and acetone and water are added to the residue, giving the product, M.P. 106–108° C. Recrystallization of this crude product from acetone-water yields the pure product, 2-(2-benzylthioethyl)-1,2,3,4-tetrahydro - 11 - hydroxypyrazino[1,2-b]-1,2-benzothiazin-1(2H))one 6,6-dioxide, M.P. 114–115° C.

Analysis.—Calcd. for C$_{20}$H$_{20}$N$_2$O$_4$S$_2$ (percent): C, 57.68; H, 4.84; N, 6.73. Found (percent): C, 57.35; H, 4.72; N, 6.50.

EXAMPLE II 1,2,3,4-tetrahydro-11-hydroxy - 2 - (2 - methylthioethyl) pyrazino[1,2-b]-1,2-benzothiazin-1(2H)-one 6,6-dioxide A solution of 0.90 g. (0.039 mole) of sodium in 40 ml. of methanol is saturated with methyl mercaptan, the excess methanol and methyl mercaptan are removed in vacuo, and 40 ml. of dimethylformamide is added. To this stirred solution is slowly added 15 g. (0.0386 mole) of (1,2,3,4-tetrahydro-11-hydroxy-1-oxopyrazino[1,2-b]-1,2 - benzothiazin-2-yl)ethylmethanesulfonate 6,6-dioxide. After the addition is complete the dimethylformamide is removed in vacuo, methanol is added, and the resulting solid is collected by filtration. The crude product is recrystallized from acetone-water to yield, as pure product, 1,2,3,4-tetrahydro-11-hydroxy-2-(2-methylthioethyl)pyrazino[1,2 - b]-1,2-benzothiazin-1(2H)-one 6,6-dioxide, M.P. 122–123° C.

Analysis.—Calcd. for C$_{14}$H$_{16}$N$_2$O$_4$S (percent): C, 49.39; H, 4.74; N, 8.23. Found (percent): C, 49.53; H, 4.82; N, 8.11.

EXAMPLE III 1,2,3,4-tetrahydro-11-hydroxy-2 - (2 - phenylthioethyl) pyrazino[1,2-b]-1,2-benzothiazin-1(2H)-one 6,6-dioxide The procedure of Example I is repeated except that an equivalent amount of thiophenol is substituted for the α-thiotoluene used therein to yield as product, 1,2,3,4-tetrahydro-11-hydroxy-2 - (2 - phenylthioethyl)pyrazino[1,2-b]-1,2-benzothiazin-1(2H)-one 6,6-dioxide, M.P. 141–142° C.

*Analysis.*—Calcd. for C₁₉H₁₈N₂O₄S₂ (percent): C, 56.70; H, 4.51; N, 6.97. Found (percent): C, 56.54; H, 4.42; N, 6.77.

EXAMPLE IV

The procedure of Example I is repeated except that an equivalent amount each of propyl mercaptan, 3-chlorothiophenol, 2,5-dibromothiophenol, 3-methylthiophenol, 3-ethoxythiophenol, 3-methyl-2-methoxythiophenol, 3,4-diethoxythiophenol, and phenethyl mercaptan are substituted for the α-thiotoluene used therein to yield, respectively:

2-[2-(3-chlorophenyl)thioethyl]-1,2,3,4 - tetrahydro - 11-hydroxypyrazino[1,2-b]-1,2-benzothiazin-1(2H) - one 6,6-dioxide;

2-[2-(2,5-dibromophenylthio)ethyl]-1,2,3,4 - tetrahydro-11-hydroxypyrazino[1,2-b]-1,2 - benzothiazin - 1(2H)-one 6,6-dioxide;

1,2,3,4-tetrahydro-11-hydroxy-2 - [2 - (3 - methylphenylthio)ethyl]pyrazino[1,2-b]-1,2 - benzothiazin - 1(2H)-one 6,6-dioxide;

2-[2-(3-ethoxyphenylthio)ethyl]-1,2,3,4 - tetrahydro - 11-hydroxypyrazino[1,2-b]-1,2-benzothiazin-1(2H) - one 6,6-dioxide;

1,2,3,4-tetrahydro-11-hydroxy-2-[2-(3-methyl - 2 - methoxyphenylthio)ethyl]pyrazino[1,2-b]-1,2-benzothiazin-1(2H)-one 6,6-dioxide;

2-[2-(3,4-diethoxyphenylthio)ethyl]-1,2,3,4 - tetrahydro-11-hydroxypyrazino[1,2-b]-1,2 - benzothiazin - 1(2H)-one 6,6-dioxide; and 1,2,3,4-tetrahydro-11-hydroxy-2-(2 - phenethylthioethyl)-pyrazino[1,2-b]-1,2-benzothiazin-1(2H)-one 6,6 - dioxide as products.

What is claimed is:
1. A 1,2,3,4-tetrahydro-11-hydroxypyrazino-[1,2-b]-1,2-benzothiazin-1(2H)-one 6,6-dioxide having the formula:

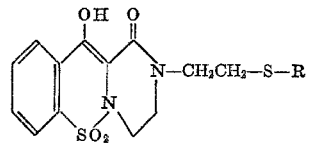

wherein R is a member of the group consisting of loweralkyl, phenyl, phenylloweralkyl, and phenyl substituted with one or two members of the group consisting of halo, loweralkyl, and loweralkoxy.

2. 2-(benzylthioethyl)-1,2,3,4-tetrahydro-11 - hydroxypyrazino[1,2-b]-1,2-benzothiazin-1(2H)-one 6,6-dioxide.

3. 1,2,3,4-tetrahydro-11-hydroxy-2-(2-methylthioethyl)pyrazino[1,2-b]-1,2-benzothiazin-1(2H)-one 6,6-dioxide.

4. 1,2,3,4-tetrahydro-11-hydroxy-2-(2-phenylthioethyl)pyrazino[1,2-b]-1,2-benzothiazin-1(2H)-one 6,6-dioxide.

References Cited
UNITED STATES PATENTS
3,408,347   10/1968   Shavel et al. _____ 260—243

JOHN M. FORD, Primary Examiner

U.S. Cl. X.R.
424—246